July 22, 1952 — E. S. LANSING — 2,604,445
SEWAGE FLOTATION AND AERATION SYSTEM
Filed Aug. 12, 1947 — 5 Sheets-Sheet 1

FIG. I.

INVENTOR.
EDWARD S. LANSING
HIS ATTORNEYS.

July 22, 1952 — E. S. LANSING — 2,604,445
SEWAGE FLOTATION AND AERATION SYSTEM
Filed Aug. 12, 1947 — 5 Sheets-Sheet 2

FIG. 2.

INVENTOR.
EDWARD S. LANSING
BY Campbell, Brumbaugh & Free
HIS ATTORNEYS.

July 22, 1952 E. S. LANSING 2,604,445
SEWAGE FLOTATION AND AERATION SYSTEM

Filed Aug. 12, 1947 5 Sheets-Sheet 3

INVENTOR.
EDWARD S. LANSING
BY Campbell, Brumbaugh
& Free
HIS ATTORNEYS.

July 22, 1952 E. S. LANSING 2,604,445
SEWAGE FLOTATION AND AERATION SYSTEM
Filed Aug. 12, 1947 5 Sheets-Sheet 4

INVENTOR.
EDWARD S. LANSING
BY
HIS ATTORNEYS.

July 22, 1952     E. S. LANSING     2,604,445
SEWAGE FLOTATION AND AERATION SYSTEM
Filed Aug. 12, 1947     5 Sheets-Sheet 5

FIG. 7.

INVENTOR.
EDWARD S. LANSING
BY *Campbell, Brumbaugh & Free*
HIS ATTORNEYS.

Patented July 22, 1952

2,604,445

UNITED STATES PATENT OFFICE 2,604,445

SEWAGE FLOTATION AND AERATION SYSTEM

Edward S. Lansing, New York, N. Y., assignor to Edward S. Lansing Corporation, New York, N. Y., a corporation of New York Application August 12, 1947, Serial No. 768,140

9 Claims. (Cl. 210—26)

This invention relates to the purification of polluted or impure liquids, such as, sewage, trade wastes and the like. It relates more particularly to the aeration or oxidation of such impure liquids and/or the flotation of solid or colloidal materials suspended therein to separate such suspended materials from the liquid.

Such impure liquids are usually purified either by converting the organic or other matter therein into stable, innocuous forms by the action of bacteria thereon or by physically removing such organic matter from the liquid.

The disadvantages of systems based on biochemical or bacterial activity combined with means for producing final clarification by sedimentation or filtration are numerous. In cases where toxic conditions exist, the necessary growth of bacteria to produce the desired results may be so retarded as to seriously affect efficient operation. Industrial wastes, as well as municipal sewage, is so often characterized by toxic waste as to preclude complete dependency on bacteria for purification.

In much the same way, clarification by sedimentation means is often unpredictable and at best, is relatively slow, and requires extensive areas for such operations where odorous and unsanitary conditions may develop.

Filtration methods for the removal of contaminating solids present recognized problems involving load capacities, condition of filter media and type of liquid being treated.

In essence, the problem of purifying municipal sewage and industrial wastes is one of not only removing suspended solids, but equally important, of removing the dispersed, dissolved or colloidal organic material present in the liquid. To a large extent, these putrescible or septic organic substances are the cause of placing a high oxygen demand on the stream or river into which the sewage or wastes are introduced. Such septic substances so deplete the dissolved oxygen that odorous, obnoxious conditions develop which may become highly unsanitary and may seriously affect normal aquatic life.

It has been suggested and demonstrated heretofore that the physical removal of colloidal organic matter in the form of a chemical floc also removes a very high percentage of the bacteria and dissolved substances by adsorption to produce a final treated effluent having a relatively high degree of purity. The production of chemical flocs is well known in the art, but, as indicated above, the removal of the flocculated material is accomplished only with considerable difficulty and at substantial expense by filtration or by sedimentation.

It has been suggested heretofore that separation of the floc could be accomplished by means of flotation methods, but these methods have, in practice, not been entirely dependable in producing the desired clean separation of the solids or suspended materials from the liquid.

Among other proposals for the treatment of impure liquids is the introduction of air or other gases in the form of bubbles into a receptacle containing the liquid so that the bubbles, in passing upwardly through the liquid, would tend to cling to the flocculated material and carry it to the surface. As a practical matter, such prior flotation operations have not been very satisfactory for the reason that the gas bubbles do not always cling to the suspended material and float it as would be expected. This probably is due to the fact that the gas is not introduced into or generated in the liquid in sufficiently finely divided form so that the bubbles will rise very slowly and gently through the liquid, thereby permitting them to adhere to the floc and buoy and lift the floc to the surface.

It has been suggested that a porous, ceramic material can be used in devices for aerating liquids to divide the air into bubbles by forcing the air through this porous material. This type of apparatus has been found to be ineffective for flotation purposes for the reason that the bubbles produced thereby are too large and tend to rise rapidly through the body of liquid, striking each other and any particles in the liquid and rebounding, rather than attaching themselves to the particles. The reason for the large bubble size is that a relatively high pressure is required to force the air through the porous material, and this high pressure compresses the air so that when it is released from the porous member, initially small bubbles expand very substantially and thus become too large for efficient flotation of flocculated material.

It has also been suggested that the air might be introduced through fine apertures in a distributing manifold, but here again, the pressure differential between the air issuing from the distributor and the pressure head in the receptacle is such as to permit the bubbles to expand and thus rise rapidly through the liquid.

An object of the present invention is to provide means and methods for continuously clarifying, oxidizing and purifying contaminated liquids by introducing air or other gas into the liquids.

Another object of the present invention is to provide a system and method of generating extremely small gas bubbles within a body of liquid to be treated so that these bubbles can attach themselves to the material in suspension in the liquid and thereby cause it to float.

Another object of the invention is to provide a system for separating contaminating materials from liquids by flotation through the medium of continuously generated minute bubbles which adhere to the contaminating materials and cause them to rise to the surface to form a thickened, cohesive slurry which can be skimmed from the surface of the liquid.

Another object of the invention is to provide a system and method for aerating liquid efficiently.

A further object of the invention is to provide a method and apparatus for reducing the biochemical oxygen demand of a liquid under treatment by constant aeration during a period of clarification of the liquid.

A still further object of the invention is to provide methods and apparatus for clarifying contaminated liquids by forced flotation of the contaminating materials in a chemical floc.

A further object of the invention is to provide a mechanism for constantly developing and introducing minute bubbles of air or other gas into a liquid, these bubbles being of very small size so that they are useful for flotation and aeration.

An additional object is to provide methods and means for continuously treating liquid under aerobic conditions to avoid the generation of odors or unsanitary conditions.

In accordance with the present invention, I have discovered that it is possible to generate continuously in a body of liquid a continuous cloud of slowly rising extremely small air or gas bubbles by circulating liquid through an eductor or aspirator nozzle and by the reduced pressure created therein mixing with and introducing into the liquid a mixture of the liquid and small quantities of air or other gas in finely diffused form, which, upon passing through the aspirator or eductor nozzle, is further divided into extremely small bubbles of about the size of the bubbles that rise in beer. These bubbles will move gently upward through the body of liquid and will aerate and oxidize the liquid, and at the same time attach themselves to material suspended in the liquid to cause such material to float.

The bubble generating system may be used for aerating industrial wastes to reduce the biochemical oxygen demand thereof, or it may be used alone or in conjunction with suitable chemical floccing agents, such as, for example, alum, in combination with sodium hydroxide, sodium silicate, sodium aluminate, sodium carbonate, rosin milk, etc. The specific chemical floccing agents may be varied considerably, depending upon the characteristics of the industrial wastes and the pH value and other factors involved. Thus, for example, when treating dairy wastes containing casein and other materials, it may be desirable to precipitate the casein by addition of an acid before adjusting the pH value and adding a flocculating agent to cause the casein and other milk solids to clump or floc.

The apparatus embodying the present invention may include one or more receptacles for receiving the liquid to be treated and having a flotation tank or pool of increased area forming a relatively quiescent zone wherein the material will float to permit it to be separated from the main body of the liquid being treated. Preferably, the mechanism for aspirating the air-liquid mixture into the impure liquid includes a circulating pump for delivering liquid through a jet of the aspirating nozzle. A second pipe or conduit connected to another jet of the aspirator has a portion at about the level of the surface of the liquid in the receptacle. This conduit is provided with a needle valve or other control device for admitting air at atmospheric pressure into the column of liquid before it is drawn through the aspirating nozzle. It is essential to control the amount of air introduced, for if air were drawn unrestrictedly into the aspirating nozzle by the flow of re-circulated liquid therethrough, the size of the air bubbles and the quantity of air delivered would cause violent agitation of the impure liquid and thereby preclude any substantial flotation of the solids or suspended material in the system. Therefore, it is necessary to produce an air-liquid mixture in which the air is in a very minor proportion to attain the small bubble size essential to the operation of the system. Also, this air preferably is introduced at atmospheric pressure and without being subjected to any substantial hydrostatic head so that the air will not be compressed and hence will not expand after it is discharged as small bubbles into the liquid.

For a better understanding of the present invention, reference may be had to the accompanying drawings, in which.

The system described hereinafter is a typical illustration of one form of system embodying the present invention. Systems of the type disclosed herein may be used for many different purposes, such as, for example, the treatment of municipal sewage, industrial wastes and the like. The size of the installation is dependent upon the quantity of material to be treated daily, and can be varied widely.

Figure 1:
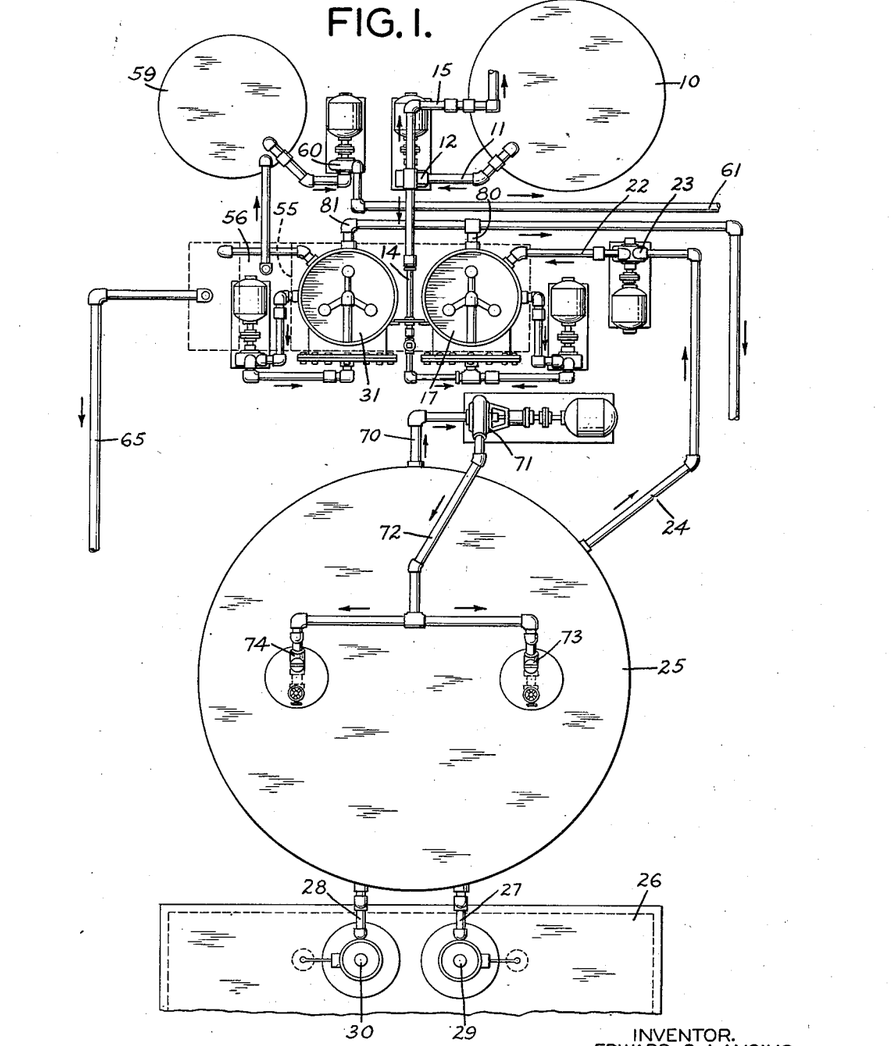
Figure 1 is a plan view of a typical system for treating industrial wastes and the like with parts omitted, or shown in dotted lines for clarity.

Referring now to Figure 1 of the drawing, a typical system for the treatment of contaminated liquids may include a tank 10 for storing chemical compounds for use in the treatment of the impure liquids. For example, the tank 10 may be used to hold alum or other flocculating agent, alkali or acid, antiseptics, such as, sodium hypochlorite and the like, all of which are used in the treatment of industrial wastes. The tank 10 is provided with a discharge conduit 11 which is connected to the intake of a motor driven pump 12 which delivers the chemical in the tank 10 through the conduit 14. Part or all of the chemical can be returned to the tank 10 by means of a conduit 15.

The conduit 14 communicates with a proportional flow device 16 through which the chemical is delivered into the interior of an influent tank 17 which is adapted to receive the liquid to be treated from a conduit 22 also communicating with the tank 17 near its bottom.

The liquid to be treated is supplied to the conduit 22 by means of a motor driven pump 23 which is connected by means of a conduit 24 to an aerating and oxidizing tank 25. The tank 25 is supplied with liquid from a main storage source 26 by means of suitable conduits 27 and 28 and the pumps 29 and 30.

Figure 2:
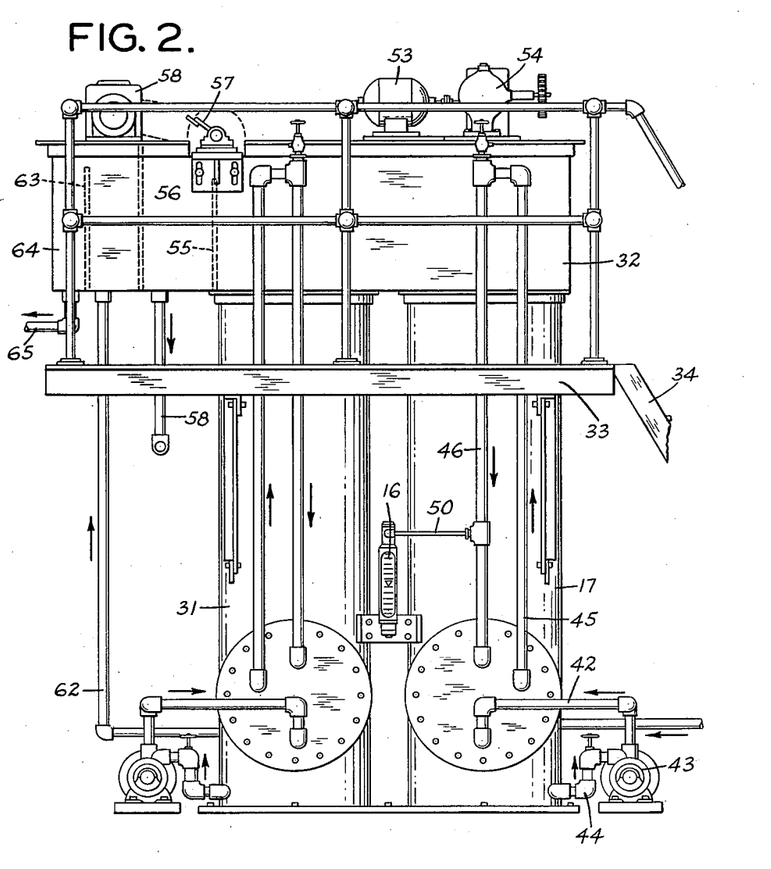
Figure 2 is a view in front elevation of the system illustrating the influent and effluent tanks of the treating system.
Figure 3:
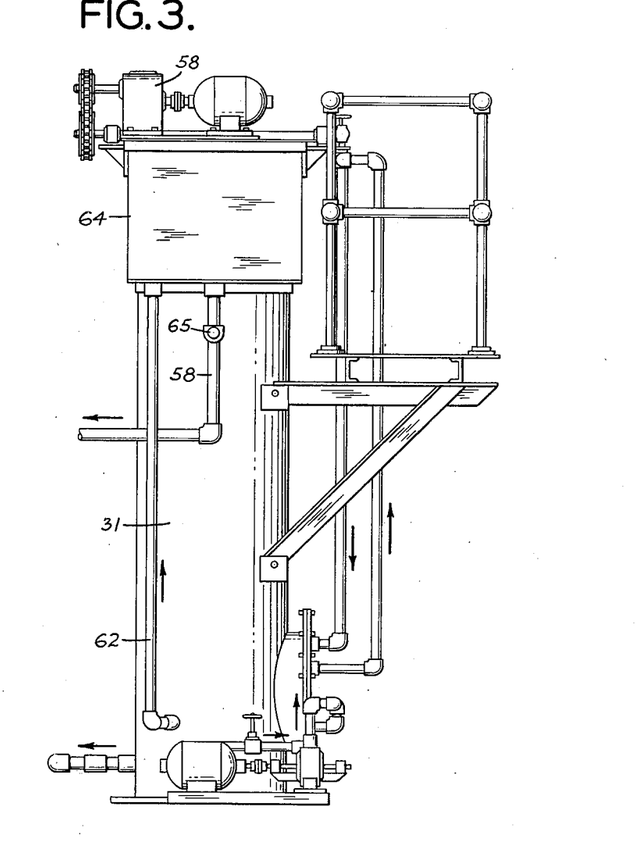
Figure 3 is a view in side elevation looking toward the left-hand side of Figure 1.
Figures 4, 5:
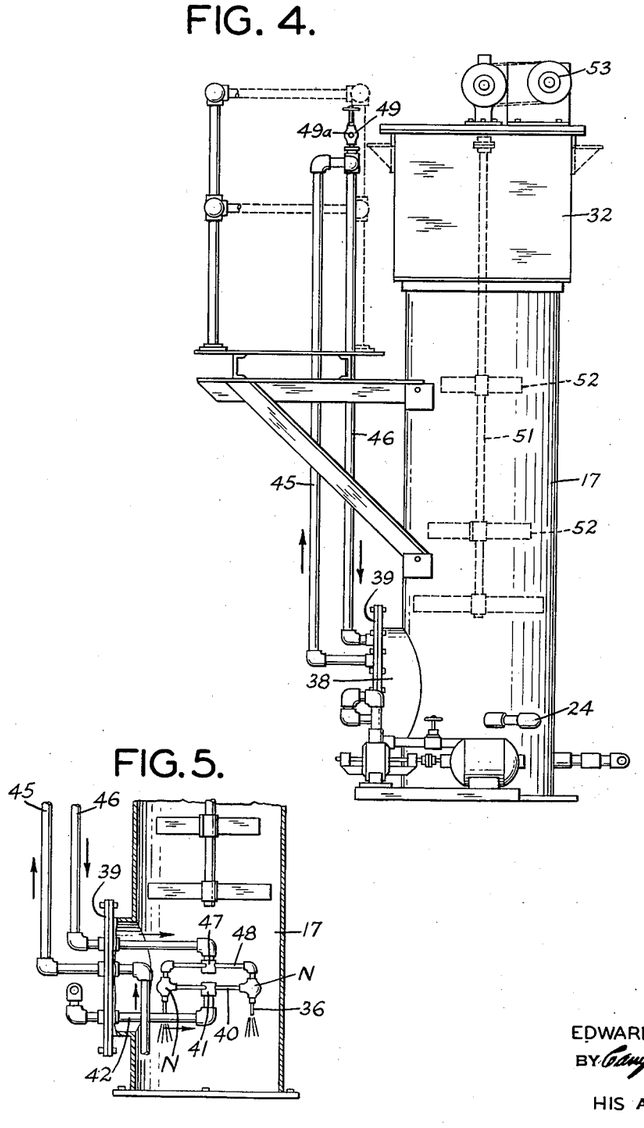
Figure 4 is a view in side elevation looking toward the right-hand side of the treating tanks in Figure 1.
Figure 5 is a view in vertical section taken through the lower end of the right-hand treating tank, as viewed in Figure 1.

The influent tank 17, as best shown in Figures 2 and 4, is generally cylindrical and is disposed adjacent to a similar effluent tank 31 with which it communicates through a box-like flotation compartment or tank 32 joined to the tops of the tanks 17 and 31, as best shown in Figure 2.

Access can be had to the flotation compartment or tank by means of a suitable cat walk 33 and ladder 34 extending from the floor to the cat walk.

Figure 6:
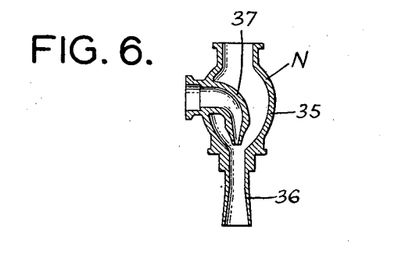
Figure 6 is a view in section through one of the eductor or aspirating nozzles showing details of construction.

As indicated above, a principal feature of the present invention is the aerating, oxidizing and flotation means whereby the liquid is purified and the suspended material is caused to float on the surface of the liquid in the flotation tank 32. This system is based upon the use of an aspirating or eductor device of the type disclosed best in Figures 5 and 6 of the drawings. As shown in Figure 6, a typical aspirating device or nozzle N which may be used in the system consists of an outer casing portion 35 having a flared nozzle 36 thereon and an inner aspirating nozzle portion 37 disposed near the inner end of the flared nozzle 36 so that when liquid is introduced through the inner nozzle 37, a reduced pressure is produced in the casing 35, inducing liquid flow therethrough and through the nozzle 36. As shown in Figures 4 and 5, the influent tank 17 is provided with a lateral extension 38 having a removable manhole cover or plate 39 thereon so that access can be had to the interior of the influent tank 17. Disposed near the bottom of the tank 17 and supported on the cover 39 are a plurality of the nozzles N so arranged that the nozzle 36 of each is directed downwardly. The inner nozzle 37 of each of the devices N is connected by suitable conduits 40 to a manifold 41 which in turn is connected to a conduit 42 extending through the cover 39. The conduit 40, as shown in Figure 2, is connected to the outlet of a motor driven pump 43 which withdraws liquid from the bottom of the tank 17 through the conduit 44. Thus, the pump 43 serves to withdraw liquid from the bottom of the tank 17 and introduce it at high velocity through the nozzle 37 to create a reduced pressure in the casing 35 of the nozzle N. This reduced pressure is utilized to introduce air into the liquid in the tank 17 in the form of finely divided bubbles of such size as to adhere to and cause flotation of the flocculated solids in the liquid.

The production of such finely divided bubbles is obtained by withdrawing liquid through the conduit 45 (Figures 2, 4 and 5) near the bottom of the tank and reintroducing the liquid with air mixed and dissolved in it through the conduit 46 and the nozzles N. The end of the conduit 46 extends into the tank 17 and is provided with a manifold 47 which is connected by means of pipes 48 to the casing 35 of the nozzle N. Thus, when the pump 43 is in operation, liquid is withdrawn through the conduit 45, flows upwardly therethrough to about the level that will be attained by the liquid in the influent and effluent tanks 17 and 31 and in the flotation tank 32, then downwardly through the conduit 45 to the nozzles N, through which it is injected into the liquid in the tank.

In order to introduced air into the liquid, the conduit 46 is provided with a needle valve 49 having a port 49a communicating with the atmosphere so that air, at atmospheric pressure and under substantially no hydrostatic pressure, is drawn into the column of liquid flowing in the conduits 45 and 46. The air is entrained in the column of liquid in the conduit 46 and probably is in a finely diffused or divided state in the liquid. In any event, the air is in the form of extremely fine bubbles when it is ejected from the nozzles N. Inasmuch as the air bubbles were formed at atmospheric pressure, there is little or no tendency for the bubbles to expand following discharge from the aspirating nozzles N or during upward movement through the body of the liquid in the tank 17.

The quantity of air introduced through the needle valve 49 must be relatively small, as otherwise, the size of the bubbles increases undesirably and such large quantities of air are introduced into the tank 17 that violent agitation takes place. The exact amount of air introduced is dependent upon a number of factors, such as the speed or pressure of the pump 43, the setting of the needle valve 49, the rate of flow in the conduit 46, the viscosity of the liquid being treated and other factors. However, the desired bubble size can be attained by adjusting the needle valve 49 to regulate the volume of air and the bubble size by inspection.

The conduits 45 and 46 may be used for introduction of the chemicals into the liquid. Thus, the flowmeter 16, as shown in Figure 2, may be connected to conduit 46 by means of the conduit 50 or it may be directly connected to the tank 17 at a point near the bottom of said tank.

To assure mixing of the chemical with the liquid, the influent tank may be provided with an agitator comprising a shaft 51 having a plurality of blades 52 thereon. The shaft 51 is driven by means of a motor 53 through suitable reduction gears 54 mounted on top of the flotation compartment 32.

The effluent tank 31 is provided with a similar aerating and bubble producing system but is not provided with an agitating mechanism for the reason that a relatively quiescent flow of the liquid is desired in this tank in order to float any solids that may pass into this tank.

The flotation compartment 32 projects laterally to the left of the effluent tank 31 and is provided with a weir 55 over which the sludge or flocculated solids are discharged into a compartment 56, as shown in Figure 1. The solids may be swept over the weir by means of a rotating paddle wheel 57 (Figure 2) which is driven by means of a motor 58 mounted on top of the compartment 32. The sludge received in the compartment 56 is discharged through a conduit 58 to a sludge-receiving tank 59 (Figure 1) where it may be treated and discharged by means of a motor driven pump 60 to waste, or for further treatment for conversion into fertilizer or the like.

The liquid from the effluent tank 31 may be withdrawn through a conduit 62 connected to the bottom of the tank 31. The conduit 62 extends upwardly to a compartment at the left-hand end of the flotation compartment 32. The effluent is discharged over the weir 63 into the compartment 64, from which it is withdrawn by the conduit 65.

Figure 7:
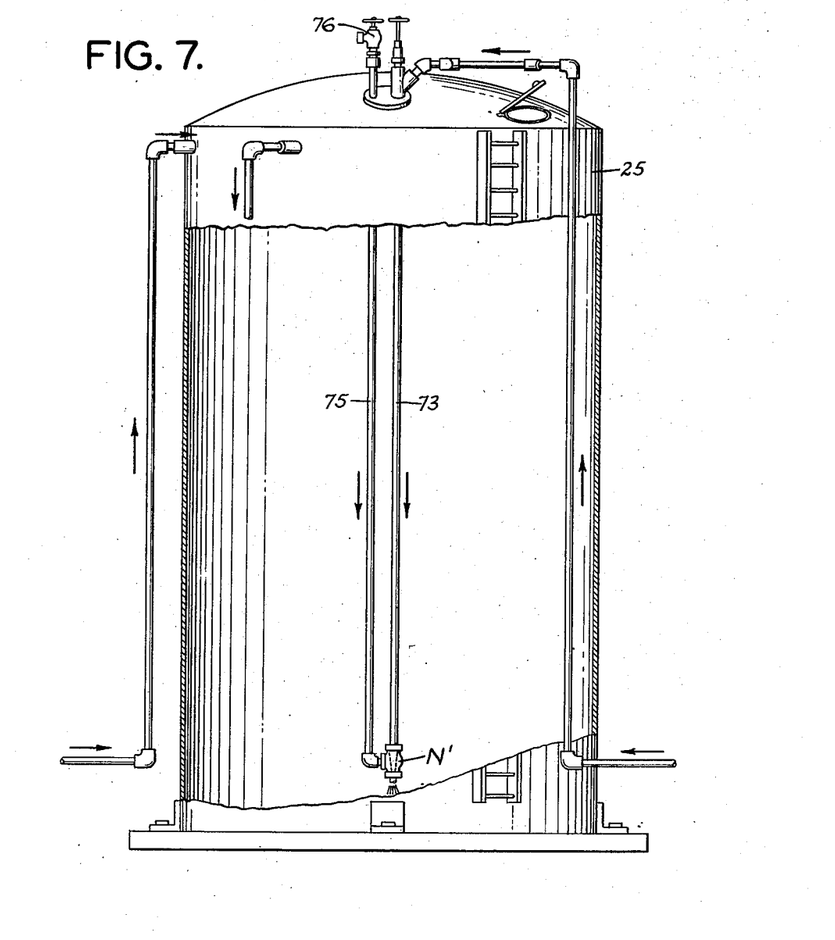
Figure 7 is a view in elevation of the aerating tank shown partly broken away to disclose details of construction.

The action of the aspirating and bubble-producing system described above is best shown in comparison with the action of the oxidizing and aerating tank 25 in Figure 7. The function of the tank 25 and the aerating system therein is to reduce the biochemical oxygen demand of the liquid and not to cause a separation or flotation of any solids that are present therein. Therefore, the flotation system described above would not be very suitable for use in the oxidizing tank 25 for it would produce a separation of the solids from the liquid by flotation. Of course, if the needle valve were fully open, the size of the bubbles would be increased greatly and agitation would take place, without much flotation.

However, the liquid in the tank 25 is treated differently than the liquid in the influent or effluent tanks, and a different aerating system is provided therefor. In this system, liquid is withdrawn from near the bottom of the tank through a conduit 70 by means of the motor driven pump 71 and is reintroduced into the top of the tank through the conduit 72 which divides and is connected with two vertical conduits 73 and 74. Each of the conduits 73 and 74 is connected to one nozzle jet of an aspirating nozzle N' similar to those described above, which is directed downwardly in the tank. The other nozzle jet of the nozzle N' is connected to an upwardly extending conduit 75 having a needle valve 76 at its upper end disposed above the top of the tank 25. It is to be observed that air, but not liquid, is drawn into the conduit 75 by the nozzle N', and, as a result, the air volume and the bubble size is so large as to cause violent agitation of the liquid in the tank 25, as well as efficient aeration. Such large air bubbles are produced that flotation does not take place in the tank 25 even though the needle valve 76 is substantially completely closed.

In operation, the impure liquid, for example, dairy wastes, in the tank 26 flows into the oxidizing and aerating tank 25 where it is agitated and oxidized by the air introduced through the aspirating or eductor nozzles N'. The treatment in the tank 25 serves to reduce the biochemical oxygen demand of the liquid. The oxidized liquid is withdrawn from the aspirating tank through the conduit 24 and introduced into the bottom of the influent tank 17 where it flows upwardly into the flotation compartment 32 and downwardly from the flotation compartment through the effluent tank 31. During the upward flow of the liquid in the tank 17, it is mixed with the chemicals for precipitating and/or flocculating solids in the liquid and is thoroughly aerated by extremely tiny bubbles produced by the aspirating or eductor nozzles N therein. The finely divided bubbles adhere to the surfaces of the flocculated solids and buoy these solids to cause them to rise to the surface of the liquid in the flotation tank. Inasmuch as the area of the flotation tank is larger than the combined surface areas of the influent and effluent tanks, the liquid in the flotation tank is quiet, and, therefore, the gas bubbles adhering to the solids are not dislodged. The partially clarified liquid below flotation level flows downwardly through the effluent tank 31 where the downwardly flowing liquid is further subjected to the action of the finely divided bubbles produced by the nozzles therein so that any solids remaining in the liquid are caused to float and rise to the surface of the liquid in the flotation tank.

The clarified liquid flows out of the conduit 62 into the chamber 64 at the end of the flotation tank and is discharged through the conduit 65.

The solids at the surface of the liquid in the flotation tank 32 are discharged over the weir 55 by the paddle member 57 and are delivered by the conduit 58 to the sludge receiving tank 59. The solids may be treated in the tank 59 and then are discharged through the conduit 61.

If it is desired to clean the influent and effluent tanks 17 and 31, suitable valved drain conduits 80 and 81 may be provided for discharging the material therein to waste or returning it for further treatment.

The above-described apparatus and the method of producing bubbles have been found to be capable of providing a very sharp separation of the solids from the liquids and a substantially purified and oxidized liquid effluent which, in many instances, can be discharged directly into streams or other bodies of water without contaminating them or destroying aquatic life therein.

The bubbles produced by the bubble generating system in the influent and effluent tanks can be controlled in size to adapt them to various oxidizing, aerating and flotation operations.

It will be understood that flotation devices of the type described above have many other uses than those illustrated and described herein and that they may be used for many of the purposes for which the prior porous air diffusion devices and the like have been used heretofore. Also, the systems may be varied in size, depending upon requirements and the number of treating stages at which the liquid is treated may be increased or decreased as the purpose demands. Therefore, the forms of the invention described herein should be considered as illustrative and not as limiting the scope of the following claims.

I claim:

1. An apparatus for aerating liquids comprising a receptacle for liquid, means for introducing liquid to be treated into said receptacle, means near the top of said receptacle for discharging liquid from said receptacle and for maintaining the liquid at about a predetermined level therein, at least one aspirating device in said receptacle near the bottom thereof, said aspirating device having a pair of jets, a pump for withdrawing liquid from said receptacle and injecting said withdrawn liquid into the liquid in said receptacle through one of said jets to create a reduced pressure at the other jet, a conduit connected to said receptacle and to said other jet and having a portion disposed at about the same level as said discharge means, a restricted inlet in said portion of said conduit through which air is drawn from the atmosphere to be entrained in the liquid in said conduit and introduced through said other nozzle into said receptacle, and means for removing floating solids from the surface of the liquid.

2. An apparatus for aerating liquids comprising a receptacle for liquid, means for introducing liquid to be treated into said receptacle, means near the top of said receptacle for discharging liquid from said receptacle and for maintaining the liquid at about a predetermined level therein, at least one aspirating device in said receptacle near the bottom thereof, said aspirating device having an aspirating jet and a discharge nozzle, a pump for withdrawing liquid from said receptacle and injecting said withdrawn liquid through said jet and nozzle to create a reduced pressure at the nozzle, a conduit connected to said receptacle and to said nozzle and having a portion disposed at about the same level as said discharge means, a needle valve in the wall of said conduit portion through which air may be drawn by suction from the atmosphere to be entrained in the liquid in said conduit and introduced through said other nozzle into said receptacle, and means for removing floating solids from the surface of the liquid.

3. An apparatus for aerating liquids and floating solids therein, which comprises a receptacle for receiving a body of liquid, means for introducing liquid to be treated into said receptacle, means near the top of said receptacle for discharging liquid from said receptacle and for maintaining the liquid at about a predetermined level therein, at least one aspirating device having a hollow casing, a nozzle communicating with the interior of said casing, and an aspirating jet in said casing in alignment with said nozzle, a conduit communicating with said receptacle near the bottom thereof and with said jet, a pump for circulating liquid through said conduit and said jet and nozzle to create a reduced pressure in said casing, a second conduit communicating with said receptacle and with the said casing for circulation of liquid therethrough by said reduced pressure, said second conduit having a portion at about the same level as said discharge means, a valve in said portion through which said second conduit communicates with the atmosphere to draw air into said conduit from atmosphere for introduction in finely divided form through said aspirating device, and means for removing floating solids from the surface of the liquid.

4. An apparatus for aerating liquids and floating flocculant solids therein which comprises a receptacle for receiving a body of liquid, means for introducing liquid to be treated into said receptacle, means near the top of said receptacle for discharging liquid from said receptacle and for maintaining the liquid at about a predetermined level therein, at least one aspirating device having inner and outer concentric jets, a conduit communicating with said receptacle near the bottom thereof and with one of said jets, a pump for circulating liquid through said conduit and said one of said jets to create a reduced pressure in said other jet, a second conduit communicating with said receptacle and with the other of said jets for circulation of liquid therethrough by said reduced pressure, said second conduit having a portion at about the same level as said discharge means, a valve in said portion through which said second conduit communicates with the atmosphere to draw air into said conduit for introduction in finely divided form through said aspirating device, and means at the top of said receptacle for skimming floating solids from the surface of said body of liquid.

5. An apparatus for aerating liquids and floating flocculated solids therein which comprises a pair of upright tanks, a compartment connecting the upper ends of said tanks having a greater area in horizontal section than the combined horizontal sectional areas of said tanks, means for introducing into the bottom portion of one of said tanks a liquid having solids therein which can be flocculated, means for withdrawing liquid from adjacent the bottom of the other tank, means for maintaining the liquid in said tanks and said compartment at a predetermined level, each of said tanks having near its bottom a bubble generating device including at least one aspirator having a pair of nozzles, means for recirculating said liquid through one of said nozzles to create a reduced pressure at the other nozzle, a conduit connected to said other nozzle extending from near the bottom of its tank upwardly to about the surface level of said liquid, a valve in said conduit for admitting air into said conduit for introduction through said other nozzle into the liquid in finely divided bubbles to float the solids therein at the surface of the liquid, and means for removing the floating solids from the surface of the liquid.

6. An apparatus for aerating liquids and floating flocculated solids therein which comprises a pair of upright tanks, a compartment connecting the upper ends of said tanks having a greater area in horizontal section than the combined horizontal sectional areas of said tanks, means for introducing into the bottom portion of one of said tanks a liquid having solids therein which can be flocculated, means for introducing a flocculating agent into said one tank, means for agitating the liquid in said one tank to mix the flocculating agent therewith, means for withdrawing liquid from adjacent the bottom of the other tank, means for maintaining the liquid in said tanks and said compartment at a predetermined level, each of said tanks having near its bottom a bubble generating device including at least one aspirator having a pair of nozzles, means for recirculating said liquid through one of said nozzles to create a reduced pressure at the other nozzle, a conduit connected to said other nozzle extending from near the bottom of its tank upwardly to about the surface level of said liquid, a valve in said conduit for admitting air into said conduit for introduction through said other nozzle into the liquid in finely divided bubbles to float the solids therein at the surface of the liquid, and means for removing the floating solids from the surface of the liquid.

7. An apparatus for aerating liquids and floating flocculated solids therein which comprises a pair of upright tanks, a compartment connecting the upper ends of said tanks having a greater area in horizontal section than the combined horizontal sectional areas of said tanks, means for introducing into the bottom portion of one of said tanks a liquid having solids therein which can be flocculated, means for aerating and oxidizing said liquid before introduction into said one tank including an aspirator for drawing air into the liquid, means for withdrawing liquid from adjacent the bottom of the other tank, means for maintaining the liquid in said tanks and said compartment at a predetermined level, each of said tanks having near its bottom a bubble generating device including at least one aspirator having a pair of nozzles, means for recirculating said liquid through one of said nozzles to create a reduced pressure at the other nozzle, a conduit connected to said other nozzle extending from near the bottom of its tank upwardly to about the surface level of said liquid, a valve in said conduit for admitting air into said conduit for introduction through said other nozzle into the liquid in finely divided bubbles to float the solids therein at the surface of the liquid, and means for removing the floating solids from the surface of the liquid.

8. An apparatus for aerating liquids and floating flocculated solids therein which comprises a pair of upright tanks, a compartment connecting the upper ends of said tanks having a greater area in horizontal section than the combined horizontal sectional areas of said tanks, means for introducing into the bottom portion of one of said tanks a liquid having solids therein which can be flocculated, means for withdrawing liquid from adjacent the bottom of the other tank, at least one weir in said compartment for maintaining the liquid in said tanks and said compartment at a predetermined level, each of said tanks having near its bottom a bubble generating device including at least one aspirator having a pair of nozzles, means for recirculating said liquid through one of said nozzles to create a reduced pressure at the other nozzle, a conduit connected to said other nozzle extending from near the bottom of its tank upwardly to about the surface level of said liquid, a valve in said conduit for admitting air into said conduit for introduction through said other nozzle into the liquid in finely divided bubbles to float the solids therein at the surface of the liquid, and means for removing the floating solids from the surface of the liquid.

9. An apparatus for effecting flotation of solid and flocculated semisolid materials suspended in a liquid which comprises a receptacle for liquid, means for introducing liquid to be treated into said receptacle, means near the top of said receptacle for discharging liquid from said receptacle and for maintaining the liquid at about a predetermined level therein, at least one aspirating device in said receptacle near the bottom thereof, said aspirating device having a pair of nozzles, pumping means for withdrawing a first column of liquid under suction from said receptacle and returning it to said receptacle through one of said nozzles, means connected to the other nozzle to withdraw a second column of liquid from said receptacle and return it to the latter in admixture with the liquid of said first column by the aspirating action of the pumped liquid at said one of said nozzles, and means to introduce air in minute quantities and at atmospheric pressure into one of said columns for ejection with the mixed columns into said receptacle in the form of minute bubbles capable of clinging to said solids and semisolids and imparting buoyancy to them to float them to the surface of the liquid in said receptacle, and means for removing said floating solids and semisolids from the surface of the liquid.

EDWARD S. LANSING.

REFERENCES CITED

The following references are of record in the file of this patent:

UNITED STATES PATENTS

| Number | Name | Date |
| --- | --- | --- |
| 360,679 | Hyatt | Oct. 12, 1886 |
| 695,399 | Kinsey | Mar. 11, 1902 |
| 721,036 | Gwynne et al. | Feb. 17, 1903 |
| 864,856 | Norris | Sept. 3, 1907 |
| 1,286,775 | Rein et al. | Dec. 3, 1918 |
| 1,394,698 | Trent | Oct. 25, 1921 |
| 2,126,164 | Anderson | Aug. 9, 1938 |
| 2,318,728 | Werking | May 11, 1943 |
| 2,440,514 | Karlstrom | Apr. 27, 1948 |
| 2,446,655 | Lawrason | Aug. 10, 1948 |
| 2,479,403 | Powers | Aug. 16, 1949 |

FOREIGN PATENTS

| Number | Country | Date |
| --- | --- | --- |
| 14,733 | Great Britain | Sept. 14, 1916 |